No. 618,603. Patented Jan. 31, 1899.
J. HENNEMAN.
ADJUSTABLE SUPPORT.
(Application filed Apr. 16, 1898.)

(No Model.)

Witnesses

Inventor
John Henneman
by John A. Hill
Atty.

UNITED STATES PATENT OFFICE.

JOHN HENNEMAN, OF CHICAGO, ILLINOIS, ASSIGNOR OF ONE-HALF TO FRANK HENNEMAN, OF SAME PLACE.

ADJUSTABLE SUPPORT.

SPECIFICATION forming part of Letters Patent No. 618,603, dated January 31, 1899.

Application filed April 16, 1898. Serial No. 677,795. (No model.)

*To all whom it may concern:*

Be it known that I, JOHN HENNEMAN, a citizen of the United States, residing at Chicago, in the county of Cook, in the State of Illinois, have invented certain new and useful Improvements in Adjustable Supports, of which the following is a description.

Figure 1:
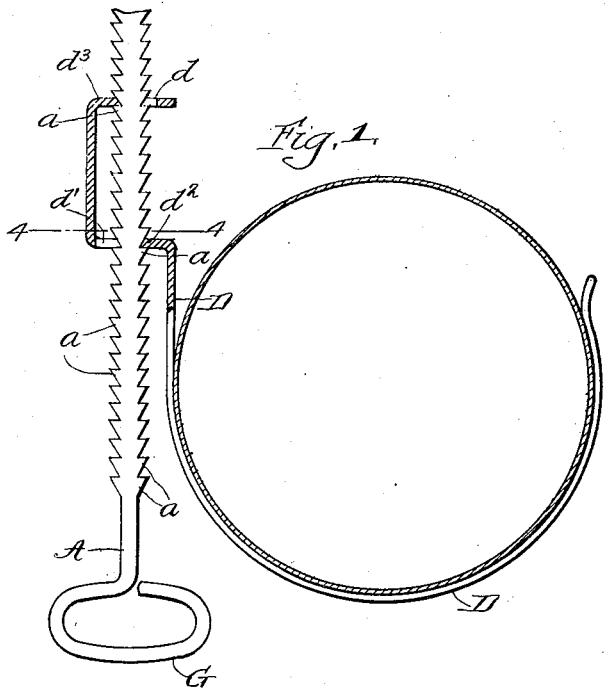
Figure 2:
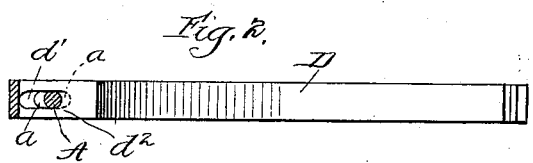

Referring to the accompanying drawings, wherein like reference-letters indicate like or corresponding parts, Figure 1 is a side view of my improved support, parts thereof being shown in section; and Fig. 2 is a view on the line 4 4 of Fig. 1.

The object of this invention is to provide a simple, economical, and efficient adjustable support particularly adapted for the support of pipes, whereby they may be easily and safely lined up and securely held in position.

To this end the invention consists in the novel construction and combination of the parts shown and described, and more particularly pointed out in the claims.

In the drawings, A represents a rod provided with means for securing the same in position to the ceiling or other convenient parts. Such means are not shown in the drawings, as no particular construction is necessary. It may be desired to have in some instances a screw at the upper end of the rod to screw into the ceiling, &c., or a hook thereon to catch in an eye in the ceiling or other devices may be employed. At the free end of the rod or bar I provide a suitable handle, that the support may be easily handled to secure the same in position. The preferred form of handle is designated at G.

D represents a loop, within which the pipe may be positioned and supported, said loop being adjustable upon the rod A.

The preferred means employed to secure the support D in its adjusted positions on the rod or bar A is shown in the drawing, in which the rod or bar A is provided with serrations or shoulders $a$, preferably on both sides, and the arm or support D is provided with the openings $d\ d'$ of sufficient size to permit the rod or bar to pass therethrough.

It will at once be seen that upon any weight being placed upon the support it causes the support to operate as a bell-crank lever. The shoulder $d^2$ becomes firmly seated upon one of the shoulders $a$, as shown, while the shoulder $d^3$ on the opposite side of the rod is caused by the action to become seated upon the shoulder $a$, as there shown. This form of device permits of the easy adjustment of the parts at any desired height.

My improved device is particularly adapted for use in supporting stovepipes and other pipes passing through rooms where it is desirable that they shall be lined up and securely held in position. To this end I prefer to construct the parts in such manner that they will be ornamental. The support D may be, and preferably is, constructed with a spring action, so as to securely hold the pipe against longitudinal movement therethrough.

After describing my improvement it is obvious that various changes in the details of constrution may be made without departing from the invention, and I do not, therefore, desire to limit myself to the exact form of construction here shown.

Having thus described my invention, what I claim as new, and desire to secure by Letters Patent, is—

1. In a device of the kind described, a supporting rod or bar having its opposite faces serrated, means for securing the same in position, a support formed of sheet metal or analogous material having its inner end extending up to form a substantially C-shaped bracket having apertured portions for engaging in the serrations on the rod or bar to hold the support in adjusted positions, substantially as described.

2. In a device of the kind described, a supporting rod or bar having its opposite faces serrated, means for securing the same in position, a sheet-metal bracket on said support adapted to engage the serrations and be held in adjusted positions, and a support secured to said bracket and adapted to move therewith, substantially as described.

JOHN HENNEMAN.

Witnesses:
LEONORA WISEMAN,
CHAS. W. PARKER.